Patented Dec. 6, 1949

2,490,757

UNITED STATES PATENT OFFICE 2,490,757

α-CARBAMOXYACRYLIC ESTERS AND RESINS PREPARED THEREFROM

Thomas T. M. Laakso and William O. Kenyon, Rochester, N. Y., assignors to Eastman Kodak Company, Rochester, N. Y., a corporation of New Jersey No Drawing. Application March 17, 1948, Serial No. 15,498

10 Claims. (Cl. 260—77.5)

This invention relates to new substituted acrylic acid esters and a process for preparing them, and to new resins prepared from these esters. More specifically, this invention relates to a process for preparing α-carbamoxyacrylic acid esters.

Acrylic acid esters having simple substituents, such as a methyl group or a chlorine atom, in the α-position have long been known, and the polymers prepared from these esters have found considerable use in various industrial fields. We have now found that other α-substituted acrylic acid esters can be prepared which are useful in the preparation of polymeric compounds.

It is, therefore, an object of our invention to provide new α-substituted acrylic acid esters. A further object is to provide a process for preparing these resins. A still further object is to provide new polymers prepared from these esters. Other objects will become apparent from a consideration of the following description.

In accordance with the process of our invention, we react a tertiary carbamic acid halide, e. g., a chloride, with an ester of a β-halogen-substituted-α-hydroxypropionic acid (i. e., a β-halogenolactate) and subsequently dehydrohalogenate the α-carbamoxy-β-halogenopropionic acid ester formed by heating it with an organic tertiary amine to give an α-carbamoxy-acrylic acid ester.

The tertiary carbamyl halides which we can advantageously use in practicing the process of our invention can be represented by the formula:

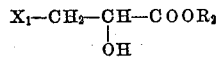

wherein R and $R_1$ each represents a member selected from the group consisting of an alkyl group, such as methyl, ethyl, n-propyl, isopropyl, n-butyl, isobutyl, secondary butyl, etc. (i. e., an alkyl group represented by the formula $C_nH_{2n+1}$ wherein $n$ represents a positive integer from 1 to 4), and an aryl group, such as phenyl, o-, m-, and p-tolyl, o-, m-, and p-chlorophenyl, α- and β-naphthyl, etc. (especially a mononuclear aryl group of the benzene series having from 6 to 7 carbon atoms), and X represents a halogen atom, such as chlorine, bromine, etc. Typical tertiary carbamyl halides include N,N-dimethylcarbamyl chloride, N,N-diethylcarbamyl chloride, N,N-di-n-propylcarbamyl chloride, N,N-di-n-butylcarbamyl chloride, N,N-diphenylcarbamyl chloride, N,N-di-p-tolylcarbamyl chloride, etc. Tertiary carbamyl halides where R and $R_1$ represent different radicals can also be used in practicing the process of our invention, e. g., N-methyl-N-phenylcarbamyl chloride, N-ethyl-N-phenylcarbamyl chloride, etc. can be used.

The β-halogenolactic acid esters which we can use in our process can be represented by the formula:

$$X_1-CH_2-CH-COOR_2$$
$$\phantom{X_1-CH_2-}|$$
$$\phantom{X_1-CH_2-}OH$$

wherein $R_2$ represents a member selected from the group consisting of an alkyl group, such as methyl, ethyl, n-propyl, isopropyl, n-butyl, isobutyl, etc. (i. e., an alkyl group having the formula $C_nH_{2n+1}$ where $n$ is a positive integer from 1 to 4), and an aralkyl group, such as benzyl, β-phenylethyl, β-phenylpropyl, β-phenylbutyl (i. e. mononuclear aralkyl group having 7 to 10 carbon atoms), and $X_1$ represents a halogen atom, such as chlorine, bromine, etc. Typical are methyl β-chlorolactate, ethyl β-chlorolactate, n-propyl β-chlorolactate, isopropyl β-chlorolactate, n-butyl β-chlorolactate, isobutyl β-chlorolactate, benzyl β-chlorolactate, methyl β-bromolactate, n-butyl β-bromolactate, etc.

After the ester of the β-halogeno-α-hydroxypropionic (β-halogenolactic) acid has been acylated with a tertiary carbamyl halide, e. g., a chloride, the α-carbamoxy-β-halogenopropionic acid ester can be separated from the reaction mixture and then purified, e. g., by distillation under vacuum or by extraction, if desired. Advantageously, we can add an organic tertiary amine to the reaction mixture resulting from the acylation with the tertiary carbamyl halide, and heat the mixture under reflux. The tertiary amines which we can use are the aliphatic amines, such as trimethylamine, triethylamine, tri-n-propylamine, tri-n-butylamine, etc.; the aromatic amines, such as N,N-dimethylaniline, N,N-diethylaniline, etc.; and the heterocyclic amines, such as pyridine, quinoline, etc.

The following equations will serve to illustrate further the mechanism of our process:

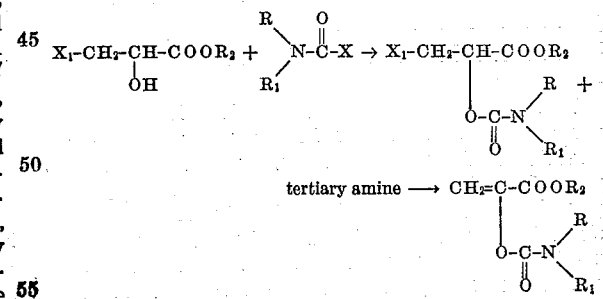

wherein R, R₁, R₂, X, and X₁ have the designated definitions set forth above.

Since a number of the β-halogenolactates which we can use as starting materials are not described in the literature, the following examples will serve to illustrate the manner in which these substances can be prepared:

EXAMPLE I.—METHYL β-CHLOROLACTATE 1525 gms. (10 mols) of β-chlorolactate acid and 3050 gms. (95 mols) of absolute methanol were placed in a glass vessel and 4% by weight of anhydrous hydrogen chloride added. The solution was then refluxed for 20 hours, at the end of which time the excess methanol was removed under vacuum, and the residue fractionally distilled. A yield of 505 grams of methyl β-chlorolactate boiling at 80–80.5° C./9 mm. was obtained. The melting point of the ester was found to be 18–21° C. Analysis was as follows:

|   | Calculated | Found |
|---|---|---|
| C | 34.67 | 34.64 |
| H | 5.07 | 5.11 |
| Cl | 25.63 | 25.71 |

EXAMPLE II.—ISOBUTYL β-CHLOROLACTATE 996 gms. (8 mols) of β-chlorolactic acid and 2000 gms. (27 mols) of isobutyl alcohol were placed in a glass vessel and 4% by weight of anhydrous hydrogen chloride passed in. The solution was then refluxed for 20 hours, and the excess isobutyl alcohol removed under vacuum. The residue was then fractionally distilled, and isobutyl β-chlorolactate boiling at 76–77° C./2.5 mm. was obtained. The distillate gradually solidified, and the melting point was observed to be 25–27° C. Analysis was as follows:

|   | Calculated | Found |
|---|---|---|
| C | 46.55 | 47.28 |
| H | 7.20 | 7.38 |
| Cl | 19.67 | 19.07 |

EXAMPLE III.—n-BUTYL β-CHLOROLACTATE 996 gms. (8 mols) of β-chlorolactic acid and 200 gms. (27 mols) of n-butanol were placed in a glass vessel and 4% by weight of dry hydrogen chloride gas passed in. The solution was then refluxed for 20 hours, and the excess n-butanol removed under vacuum. The residue was fractionally distilled, and an 85% yield of n-butyl β-chlorolactate boiling at 118–119° C./16 mm. was obtained. Analysis was as follows:

|   | Calculated | Found |
|---|---|---|
| C | 46.60 | 46.03 |
| H | 7.20 | 7.60 |
| Cl | 19.60 | 19.15 |

The ethyl ester of β-chlorolactic acid was described by C. F. Koelsch in the "Journal of the American Chemical Society," vol. 52 (1930), pages 1105–1106. Koelsch also described the preparation of β-chlorolactic acid, oxidizing glycerol chlorohydrin to the acid. By substituting molecularly equivalent amounts of other alcohols in the above examples, other esters of β-chlorolactic acid can be prepared. For example, benzyl alcohol can replace the methanol of Example I to produce benzyl β-chlorolactate having the formula:

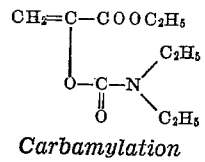

In a similar manner n-propanol and isopropanol can replace the n-butanol or isobutanol of Examples II and III to produce β-chlorolactic acid esters of these alcohols.

The following examples will serve to demonstrate further the method whereby we prepare our esters of α-carbamoxyacrylic acids.

EXAMPLE IV.—ETHYL α-N,N-DIETHYLCARBAMOXYACRYLATE

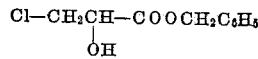

Carbamylation 200 gms. (1.45 moles) of N,N-diethylcarbamyl chloride, prepared in accordance with the process described by Lumiere and Purin, "Bull. Soc. Chem. de France," vol. 3, (1904), No. 31, page 689, were added to 200 gms. (1.3 moles) of ethyl β-chlorolactate, and the mixture heated on a steam bath under anhydrous conditions until hydrogen chloride was no longer evolved.

Dehydrochlorination

To the above reaction mixture, 168 gms. (1.3 moles) of anhydrous quinoline, dissolved in approximately 600 cc. of dry, thiophene-free benzene were added, and the mixture stirred under reflux for 12 hours. The reaction mixture was then chilled, and quinoline hydrochloride was received as a precipitate. This precipitate was filtered off, and the filtrate, after concentration of the benzene, was carefully fractionated under a good vacuum. A fraction boiling at 143 to 145° C./3 mm. was obtained as distillate, which was dissolved in ethylene dichloride. This solution was successively washed with ice-cold 2% sulfuric acid, ice-cold water, cold 2% sodium carbonate solution, and again with ice-cold water. After concentration of the ethylene dichloride, the residual oil was again fractioned under a high vacuum. Ethyl α-N,N-diethylcarbamoxyacrylate, boiling at 67 to 70° C./0.6 mm., was obtained in good yield having the analysis:

|   | Calculated | Found |
|---|---|---|
| Carbon | 55.8 | 56.1 |
| Hydrogen | 7.9 | 8.3 |
| Nitrogen | 6.5 | 6.4 |

When molecularly equivalent amounts of N,N-di-n-butylcarbamyl chloride and methyl β-chlorolactate are substituted in the above example, methyl α-N,N-di-n-butylcarbamoxyacrylate represented by the formula:

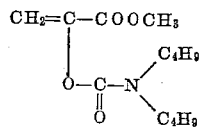

can be obtained in good yield. Similarly, when N,N-di-n-propylcarbamyl chloride and n-butyl β-chlorolactate are substituted in Example IV in molecularly equivalent amounts, n-butyl α-N,N- di-n-propylcarbamoxyacrylate represented by the formula:

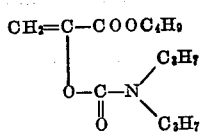

can be obtained.

EXAMPLE V.—ETHYL α-N,N-DIPHENYLCARBAMOXYACRYLATE

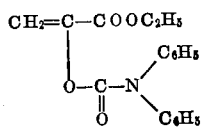

*Carbamylation*

75 gms. (0.28 mole) of N,N-diphenylcarbamyl chloride, prepared in accordance with the process described by Conduche, "Annales de Chimie et de Physique" [8], vol. 13 (1908), page 71, were added to 24 gms. (0.3 mole) of pyridine, and the mixture heated until it became homogenous. To the mixture, 56 gms. (0.3 mole) of molten ethyl β-chlorolactate were slowly added. After the addition, heat was applied gently to complete the reaction.

*Dehydrochlorination*

To the above reaction mixture, 52 gms. (0.4 mole) of quinoline and 250 cc. of toluene were added, and the mixture was stirred under reflux for 4 hours. The reaction mixture was allowed to cool, and then was dissolved in 500 cc. of ethylene di-chloride. The solution was washed with cold dilute sulfuric acid, and the oil layer was washed free of acid with cold water. After drying with anhydrous calcium sulfate, the ethylene di-chloride was distilled off, and the residue fractionated under reduced pressure. The main fraction, boiling at 140 to 145° C./0.3 mm. was collected. The yield of ethyl α-N,N-diphenylcarbamoxyacrylate was 26.7 gms.

When N,N-di-p-tolylcarbamyl chloride and benzyl β-chlorolactate are substituted in molecularly equivalent amounts in the above example, benzyl α-N,N-di-p-tolylcarbamoxyacrylate represented by the formula:

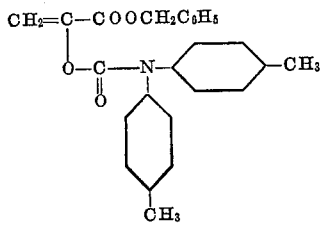

can be obtained.

EXAMPLE VI.—ETHYL α-N-ETHYL-N-PHENYLCARBAMOXYACRYLATE

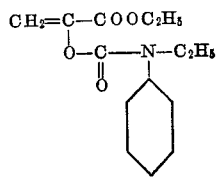

*Carbamylation*

91.8 gms. (0.5 mole) of N-ethyl-N-phenylcarbamyl chloride, prepared in accordance with the process described by Michler "Berichte," vol. 9 (1876), page 399, were dissolved in 40 gms. (0.5 mole) of pyridine. 76.3 gms. (0.5 mole) of ethyl β-chlorolactate were slowly added to the solution, and the solution was heated gently until no more hydrogen chloride was evolved.

*Dehydrochlorination*

To the above solution, 65.0 gms. (0.5 mole of quinoline and 250 cc. of toluene were added, and the mixture held under reflux for 4 hours. The reaction mixture was allowed to cool, and the cold mixture was dissolved in 500 cc. of ethylene di-chloride, and the solution washed with cold dilute sulfuric acid. The oil layer was then washed free of acid with cold water, and after drying over anhydrous calcium sulfate, the ethylene di-chloride was distilled off under vacuum. The residue was then fractionated under reduced pressure, and a product, boiling at 125 to 126° C./0.15 mm., was obtained. The yield amounted to 57 gms.

By substituting other carbamyl halides and β-halogenolactic acid esters in the above examples, other esters of carbamoxyacrylic acids can be prepared. For example, by substituting N-methyl-N-phenylcarbamyl chloride and isobutyl β-chlorolactate in molecularly equivalent amounts in Example VI, isobutyl α-N-methyl-N-phenylcarbamoxyacrylate represented by the formula:

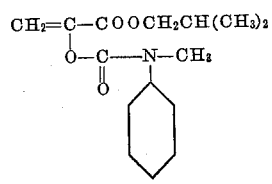

can be obtained.

The esters prepared as described above can be homopolymerized or inter-polymerized with another co-polymerizable unsaturated compound with ease. The velocity of the polymerization can be accelerated to a considerable extent by heating, or by the use of polymerization catalysts which are known to accelerate the polymerization of vinyl-type compounds. Such catalysts are the organic peroxides (e. g. benzoyl peroxide, acetyl peroxide, acetyl benzoyl peroxide, lauroyl peroxide, oleoyl peroxide, etc.), hydrogen peroxides, perborates (e. g. sodium and potassium perborates), and persulfates (e. g. sodium, potassium, and ammonium persulfates).

Although elevated temperatures can be advantageously be used, we can use temperatures varying from ordinary room temperature (20–25° C.) to approximately 60–65° C. Higher temperatures can be used, however, the above range is usually adequate. The polymerization can also be carried out by the bead or emulsion method in which water or some other medium in which the monomers are insoluble is employed as a dispersing medium, with or without emulsifying agents. The polymerizations can also be performed by use of a solvent which dissolves the monomer, but not the polymer, which precipitates from the solution as it forms. Alternatively, the diluent or solvent, such as benzene, toluene, xylene, etc., can be a solvent for the polymer. The emulsion method of polymerization has been found to be particularly advantageous since the rate of polymerization and form of polymer can be easily controlled.

The esters prepared in accordance with our invention can either be homopolymerized or copolymerized with another unsaturated compound containing a

group. The following examples will illustrate the manner in which we prepare polymers from our α-carbamoxyacrylic esters.

EXAMPLE VII.—HOMOPOLYMER OF ETHYL α-N-DIETHYLCARBAMOXYACRYLATE

The ester prepared in Example IV above was polymerized by heating at 50° C. in the presence of 0.1% benzoyl peroxide as a polymerization catalyst. A clear, colorless, hard mass of polymer was obtained which had the following analysis:

|  | Calculated | Found |
|---|---|---|
| Carbon | 55.8 | 55.3 |
| Hydrogen | 7.9 | 7.8 |
| Nitrogen | 6.5 | 6.2 |

Similarly, n-butyl α-N,N-di-n-propyl-carbamoxyacrylate or methyl α-N,N-di-n-butylcarbamoxyacrylate, prepared as described above can be homopolymerized to clear, colorless resins.

EXAMPLE VIII.—HOMOPOLYMER OF ETHYL α-N-ETHYL-N-PHENYLCARBAMOXYAC- RYLATE

The ester prepared in Example VI above was polymerized by heating at 50° C. in the presence of 0.1% benzoyl peroxide as a polymerization catalyst. An amber-colored polymer was obtained. This polymer was purified, by dissolving in acetone and precipitating in water, to give a clear colorless resin which had the following analysis:

|  | Calculated | Found |
|---|---|---|
| C | 63.8 | 63.7 |
| H | 6.5 | 6.6 |
| N | 5.3 | 5.1 |

Similarly, when benzyl α-N-methyl-N-phenylcarbamoxyacrylate is substituted in the above example, a clear, hard resin can be obtained. Likewise, other esters of α-carbamoxyacrylic acids prepared in accordance with the process of our invention can be used to prepare clear, hard resins.

The polymers described above are soluble in the common organic solvents, such as the halogenated hydrocarbons (e. g., ethylene dichloride, chloroform, etc.), a property which makes them useful in the preparation of lacquers. They are also adaptable to machining into any desired shape, and they are useful in modifying the properties of other resins.

While we have investigated α-carbamoxyacrylic acid esters wherein one of the "R" groups, substituted on the nitrogen atom, represents a hydrogen atom, difficulty was experienced in obtaining these compounds, which was probably due to the tendency for hydrogen halide to split out to give a compound of the type

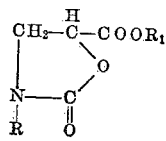

We claim:
1. An ester represented by the formula:

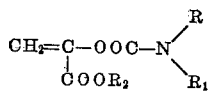

wherein R and $R_1$ each represents a member selected from the group consisting of an alkyl group having from 1 to 4 carbon atoms and a mononuclear aryl group of the benzene series, and $R_2$ represents a member selected from the group consisting of an alkyl group having from 1 to 4 carbon atoms and a mononuclear aralkyl group containing 7 to 10 carbon atoms.

2. An ester represented by the formula:

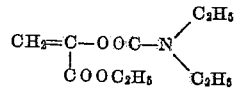

3. An ester represented by the formula:

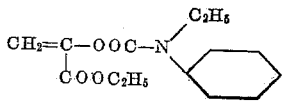

4. An ester represented by the formula:

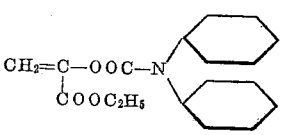

5. A process for preparing an ester of an α-carbamoxyacrylic acid comprising reacting an ester represented by the formula:

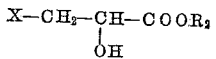

wherein $R_2$ represents a member selected from the group consisting of an alkyl group having from 1 to 4 carbon atoms and a mononuclear aralkyl group containing 7 to 10 carbon atoms, and X represents a halogen atom, with an acid chloride represented by the formula:

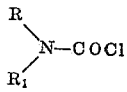

wherein R and $R_1$ each represents a member selected from the group consisting of an alkyl having from 1 to 4 carbon atoms and a mononuclear aryl group of the benzene series, and thereafter dehydrohalogenating the ester of an α-carbamoxy-β-halogen-propionic acid formed by heating with an organic tertiary amine to give an ester represented by the formula:

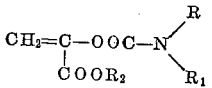

wherein R and $R_1$ each represents a member selected from the group consisting of an alkyl group having from 1 to 4 carbon atoms and a mononuclear aryl group of the benzene series, and $R_2$ represents a member selected from the group consisting of an alkyl group having from 1 to 4 carbon atoms and a mononuclear aralkyl group containing 7 to 10 carbon atoms.

6. A process for preparing an ester of an α-carbamoxyacrylic acid comprising reacting an ester represented by the formula:

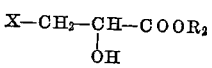

wherein $R_2$ represents a member selected from the group consisting of an alkyl group having from 1 to 4 carbon atoms and a mononuclear aralkyl group containing 7 to 10 carbon atoms, and X represents a halogen atom, with an acid chloride represented by the formula:

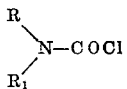

wherein R and R₁ each represents a member selected from the group consisting of an alkyl group having from 1 to 4 carbon atoms and a mononuclear aryl group of the benzene series, and thereafter dehydrohalogenating the ester of an α-carbamoxy-β-halogen-propionic acid formed by heating with quinoline to give an ester represented by the formula:

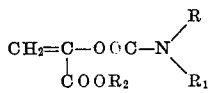

wherein R and R₁ each represents a member selected from the group consisting of an alkyl group having from 1 to 4 carbon atoms and a mononuclear aryl group of the benzene series, and R₂ represents a member selected from the group consisting of an alkyl group having from 1 to 4 carbon atoms and a mononuclear aralkyl group containing 7 to 10 carbon atoms.

7. A polymer of an ester represented by the formula:

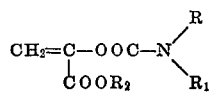

wherein R and R₁ each represents a member selected from a group consisting of an alkyl group having from 1 to 4 carbon atoms and a mononuclear aryl group of the benzene series, and R₂ represents a member selected from the group consisting of an alkyl group having from 1 to 4 carbon atoms and a mononuclear aralkyl group containing 7 to 10 carbon atoms.

8. A process for preparing ethyl α-N,N-diethylcarbamoxyacrylate comprising reacting ethyl β-chlorolactate with N,N-diethylcarbamyl chloride, and thereafter dehydrohalogenating the ethyl α-N,N-diethylcarbamoxy-β-chloropropionate formed, by heating with quinoline to give ethyl α-N,N-diethylcarbamoxyacrylate.

9. A process for preparing ethyl α-N,N-diphenylcarbamoxyacrylate comprising reacting ethyl β-chlorolactate with N,N-diphenylcarbamyl chloride, and thereafter dehydrohalogenating the ethyl α-N,N-diphenylcarbamoxy-β-chloropropionate formed, by heating with quinoline to give ethyl α-N,N-diphenylcarbamoxyacrylate.

10. A process for preparing ethyl α-N-ethyl-N-phenylcarbamoxyacrylate comprising reacting ethyl β-chlorolactate with N-ethyl-N-phenylcarbamyl chloride, and thereafter dehydrohalogenating the ethyl-α-N-ethyl-N-phenylcarbamoxy-β-chloropropionate formed, by heating with quinoline to give ethyl α-N-ethyl-N-phenylcarbamoxyacrylate.

THOMAS T. M. LAAKSO.
WILLIAM O. KENYON.

No references cited.

Certificate of Correction

Patent No. 2,490,757 December 6, 1949

THOMAS T. M. LAAKSO ET AL.

It is hereby certified that errors appear in the printed specification of the above numbered patent requiring correction as follows:

Column 7, line 10, for "α-N-DIETHYLCARBAMOXYACRYLATE" read *α-N,N-DIETHYLCARBAMOXYACRYLATE*; column 8, line 50, after the word "alkyl" insert *group;* and that the said Letters Patent should be read with these corrections therein that the same may conform to the record of the case in the Patent Office.

Signed and sealed this 18th day of April, A. D. 1950.

[SEAL]

THOMAS F. MURPHY,
*Assistant Commissioner of Patents.*